(12) United States Patent
Wang et al.

(10) Patent No.: US 12,280,895 B1
(45) Date of Patent: Apr. 22, 2025

(54) AZIMUTH AMBIGUITY SUPPRESSION METHOD FOR SPACEBORNE SAR IN SPATIALLY NON-UNIFORM SAMPLING

(71) Applicant: Aerospace Information Research Institute, Chinese Academy of Sciences, Beijing (CN)

(72) Inventors: Yu Wang, Beijing (CN); ZhiYuan Xue, Beijing (CN); Liang Li, Beijing (CN); YongHua Cai, Beijing (CN); Bo Li, Beijing (CN); YiJiang Nan, Beijing (CN); PingPing Lu, Beijing (CN)

(73) Assignee: Aerospace Information Research Institute, Chinese Academy of Sciences, Beijing (CN)

( * ) Notice: Subject to any disclaimer, the term of this patent is extended or adjusted under 35 U.S.C. 154(b) by 0 days.

(21) Appl. No.: 18/962,937

(22) Filed: Nov. 27, 2024

(30) Foreign Application Priority Data

Aug. 13, 2024 (CN) .......................... 202411108412.7

(51) Int. Cl.
*G01S 13/90* (2006.01)
*B64G 1/24* (2006.01)
*G01S 7/32* (2006.01)

(52) U.S. Cl.
CPC .................. *B64G 1/24* (2013.01); *G01S 7/32* (2013.01); *G01S 13/9011* (2013.01)

(58) Field of Classification Search
CPC .......... B64G 1/24; G01S 7/32; G01S 13/9011
See application file for complete search history.

(56) References Cited

PUBLICATIONS

Zhao, Shuo, et al. "Modifications on multichannel reconstruction algorithm for SAR processing based on periodic nonuniform sampling theory and nonuniform fast Fourier transform." IEEE Journal of Selected Topics in Applied Earth Observations and Remote Sensing 8.11 (2015) (Year: 2015).*

(Continued)

*Primary Examiner* — Peter M Bythrow
*Assistant Examiner* — Nazra Nur Waheed
(74) *Attorney, Agent, or Firm* — Seed IP Law Group LLP

(57) ABSTRACT

An azimuth ambiguity suppression method for a spaceborne SAR in spatially non-uniform sampling relates to the technical field of radars. The method includes the following steps: step 1: compensating for a phase difference between the channels according to the locations of transmitting and receiving stations for channel echoes; step 2: calculating an equivalent azimuth sampling location of each channel at the moment of each pulse transmission; step 3: sorting the equivalent azimuth sampling locations of all channels and their corresponding echoes after the phase difference between the channels is compensated in ascending order; and step 4: calculating reconstructed echoes from the sorted equivalent azimuth sampling locations and corresponding echoes after the phase difference between the channels is compensated, by using an adaptive weight-conjugate gradient-Toeplitz matrix (ACT) algorithm. According to the present disclosure, a relative distance between the channels is not required to remain unchanged, which greatly expands the scope of application of azimuth multi-channel SAR echo reconstruction.

5 Claims, 3 Drawing Sheets

(56) References Cited

PUBLICATIONS

Liu, Na, et al. "Modified multichannel reconstruction method of SAR with highly nonuniform spatial sampling." IEEE Journal of Selected Topics in Applied Earth Observations and Remote Sensing 10.2 (2017) (Year: 2017).*

Zhang, Yongwei, et al. "Quadratically constrained ambiguity suppression algorithm for APC/multichannel SAR systems with non-uniform spatial sampling." IEEE Transactions on Geoscience and Remote Sensing 59.2 (2020) (Year: 2020).*

* cited by examiner

AZIMUTH AMBIGUITY SUPPRESSION METHOD FOR SPACEBORNE SAR IN SPATIALLY NON-UNIFORM SAMPLING

TECHNICAL FIELD

The present disclosure belongs to the technical field of radars, and more particularly, relates to an azimuth ambiguity suppression method for a spaceborne SAR in spatially non-uniform sampling.

RELATED ART

A synthetic aperture radar (SAR), which serves as an active imaging radar, has all-time and all-weather earth observation capabilities. SAR emits electromagnetic waves to a target area for a plurality of times from different perspectives and receives echo signals, and a two-dimensional image of the target area is obtained by a synthetic aperture imaging algorithm. There is a mutually constrained relationship between a pulse repetition frequency (PRF) and a range swath of an SAR system. In order to achieve a high-resolution wide-swath SAR, an azimuth multi-channel technology has been proposed in recent years. It operates in such a way of receiving echoes simultaneously from receiving channels at different spatial locations after each pulse transmission. The azimuth multi-channel technology can reduce the PRF required for the same azimuth resolution proportionally, and is thus an important technology at present to achieve the high-resolution wide-swath SAR.

In azimuth multi-channel SAR imaging, multi-channel echoes need to be reconstructed into equivalent single-channel echoes. The existing reconstruction method was proposed by Krieger et al. from DLR in 2004 and implemented by a group of reconstruction filters. This method is based on the principle of periodic non-uniform sampling, which requires a relative location of a transmitting channel to each receiving channel to remain unchanged. For a single-platform system, this condition is easy to meet, but for a distributed system, the relative location between the channels is easily affected by the relative motion between the platforms, which makes an effect of a reconstruction filter method worsened and fails to meet imaging requirements.

BRIEF SUMMARY

In order to solve the above technical problems, the present disclosure provides an azimuth ambiguity suppression method for a spaceborne SAR in spatially non-uniform sampling. Based on a principle of completely non-uniform sampling, the method reconstructs equivalent single-channel echoes from multi-channel echoes according to a relative location between channels at the moment of each pulse transmission. Compared with the existing reconstruction methods, the proposed method does not need to remain a relative distance between the channels unchanged, which greatly expands the scope of application of azimuth multi-channel SAR echo reconstruction.

To fulfill said object, the present disclosure adopts the following technical solutions.

An azimuth ambiguity suppression method for a spaceborne SAR in spatially non-uniform sampling includes the following steps:

step 1: compensating for a phase difference between the channels according to the locations of the transmitting and receiving stations for channel echoes;

step 2: calculating an equivalent azimuth sampling location of each channel at the moment of each pulse transmission;

step 3: sorting the equivalent azimuth sampling locations of all channels and their corresponding echoes after the phase difference between the channels is compensated in an ascending order; and step 4: calculating reconstructed echoes by using an adaptive weight-conjugate gradient-Toeplitz matrix (ACT) algorithm in combination with the sorting result in step 3.

The present disclosure has the following beneficial effects.

According to the present disclosure, the relative distance between the channels is not required to remain unchanged, and the echo reconstruction can be effectively completed in the presence of relative motion between the channels. Compared with the existing reconstruction filter method, an ambiguous target that appears after azimuth compression can be significantly suppressed, and the energy of the ambiguous target is reduced by 30 dB, thereby greatly expanding the scope of application of azimuth multi-channel SAR echo reconstruction.

BRIEF DESCRIPTION OF THE DRAWINGS

FIG. 2 (b) shows an azimuth spectrum of echoes reconstructed by the method of the present disclosure;

FIG. 3 (b) shows a result of azimuth compression of echoes reconstructed by the method of the present disclosure.

DETAILED DESCRIPTION OF THE DISCLOSURE

The following will clearly and completely describe the technical solutions in the embodiments of the present disclosure in conjunction with the accompanying drawings in the embodiments of the present disclosure. Obviously, the described embodiments are only some embodiments of the present disclosure, not all embodiments. Based on the embodiments in the present disclosure, all other embodiments derived by a person of ordinary skill in the art without creative efforts shall fall within the protection scope of the present disclosure.

Figure 1:
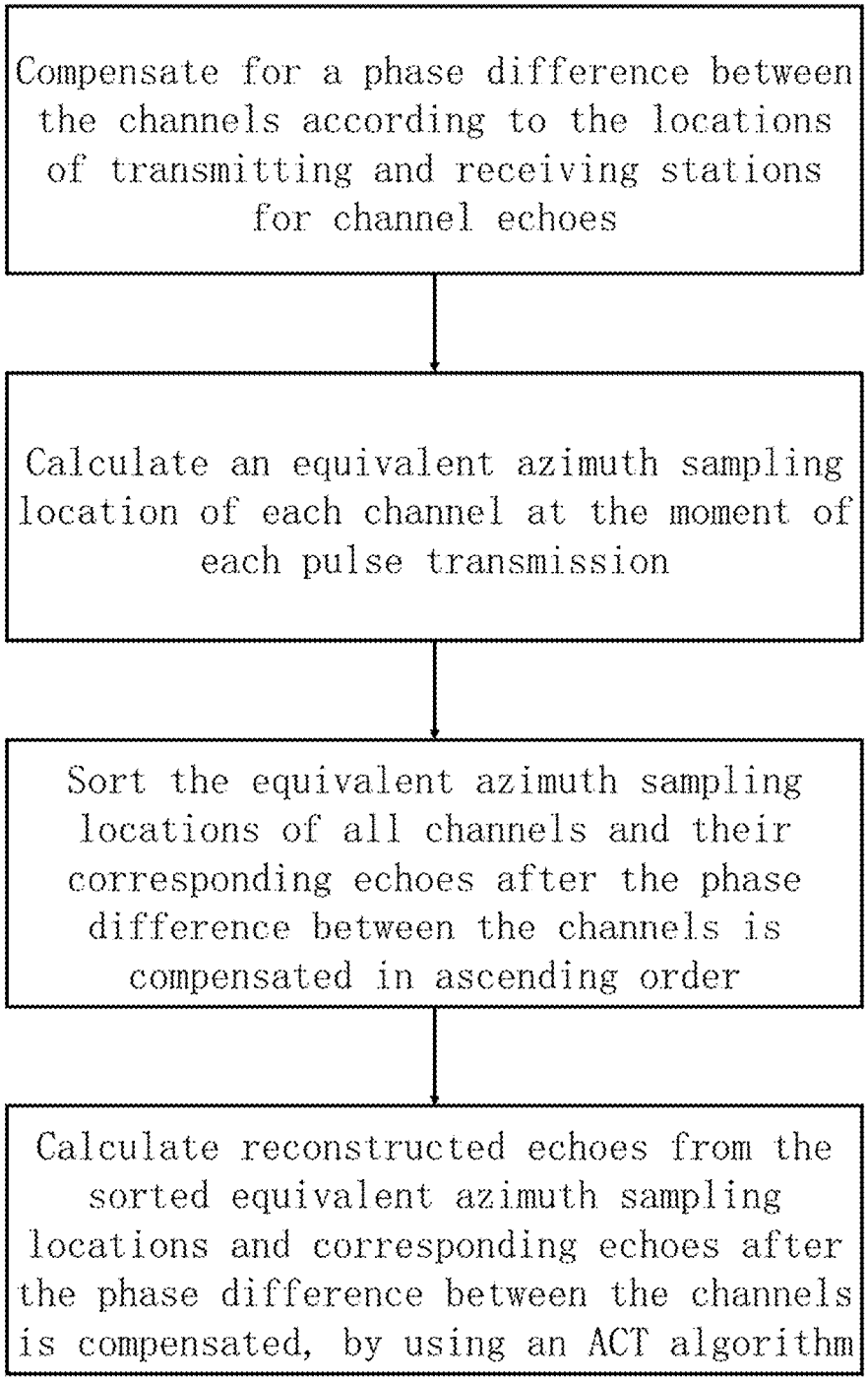
FIG. 1 is a flowchart of an azimuth ambiguity suppression method for a spaceborne SAR in spatially non-uniform sampling.

According to an embodiment of the present disclosure, as shown in FIG. 1, an azimuth ambiguity suppression method for a spaceborne SAR in spatially non-uniform sampling of the present disclosure includes the following steps.

Step 1: compensate for a phase difference between the channels according to the locations of the transmitting and receiving stations for channel echoes:

set an operating carrier wavelength of an azimuth multi-channel SAR system to be $\lambda$, wherein the SAR system includes one transmitting channel and M receiving channels, with N pulses being transmitted in total; and each time pulses are transmitted from the transmitting channel, the echoes are received separately by the M receiving channels. A pulse repetition frequency is denoted as $F_p$, and a nominal moving speed is v. There is only a location shift between each receiving channel and the transmitting channel in an azimuth direction. For a transmission moment of a (i=1, ..., N)$^{th}$ pulse, an azimuth location of the transmitting channel is denoted as $x_i$, an azimuth relative location of the (k=1, ..., M)$^{th}$ receiving channel to the transmitting channel is denoted as $\Delta x_{ik}$, and the received multi-channel echo is denoted as s($x_i$, $\Delta x_{ik}$, r) after being corrected for channel errors and preprocessed for phase synchronization, wherein r is a range sampling point, and a reference slant-range distance of an imaging scene is $r_0$; and then, the multi-channel echo $s_{comp}$ after compensating the phase difference between the channels according to the locations of the transmitting and receiving stations is expressed as:

$$s_{comp}(x_i, \Delta x_{ik}, r) = s(x_i, \Delta x_{ik}, r) \times \exp\left[\frac{j\pi\Delta x_{ik}^2}{2\lambda r_0}\right] \quad (1)$$

in which, exp represents natural exponential operation, $j=\sqrt{-1}$ represents an imaginary number, and $\pi$ denotes pi.

Step 2: calculate an equivalent azimuth sampling location of each channel at the moment of each pulse transmission.

For a transmission moment of an i$^{th}$ pulse and a k$^{th}$ receiving channel, the corresponding equivalent azimuth sampling location $x'_{ik}$ is expressed as:

$$x'_{ik} = x_i + \frac{\Delta x_{ik}}{2}. \quad (2)$$

Step 3: sort the equivalent azimuth sampling locations of all channels and their corresponding echoes after the phase difference between the channels is compensated in ascending order.

The transmission moments of N pulses and all the equivalent azimuth sampling locations corresponding to the M receiving channels are sorted in ascending order, a list of the sorted equivalent azimuth sampling locations x', being expressed as:

$$x'_l \in \{X'_{ik}, i=1, \ldots, N, k=1, \ldots, M\}, l=1, \ldots, M \times N,$$
$$x'_{l-1} \leq x'_l \leq x'_{l+1} \quad (3).$$

The corresponding multi-channel echo after the phase difference between the channels is compensated is expressed as:

$$s_{comp}(x'_l, r) = s_{comp}(x_i, \Delta x_{ik}, r) \leftarrow x'_l = x'_{ik} \quad (4).$$

Step 4: calculate reconstructed echoes from the sorted equivalent azimuth sampling locations and corresponding echoes after the phase difference between the channels is compensated, by using an adaptive weight-conjugate gradient-Toeplitz matrix (ACT) algorithm. The ACT algorithm was proposed by Feichtinger et al. in 1995 as an efficient numerical algorithm for completely non-uniform sampling, which can calculate uniformly sampled signals from completely non-uniformly sampled signals with limited bandwidth. The process used to calculate the reconstructed echoes is as follows:

the sorted equivalent azimuth sampling locations $x'_l$ are normalized, such that $0 \leq t_1 < \ldots < t_{M \times N} < 1$, denoted as:

$$t_l = (x'_l - x'_1)/(Nv/F_p) \quad (5)$$

in which, $t_l$ represents the normalized sorted equivalent azimuth sampling location $x'_l$, letting $t_0 = t_{M \times N} - 1$, $t_{M \times N+1} = t_1 + 1$, and then an adaptive weight is calculated as:

$$w_l = (t_{l+1} - t_{l-1})/2 \quad (6).$$

The required Toeplitz matrix T is a square matrix of (M×N)×(M×N), and elements in an n$^{th}$ column and an m$^{th}$ row of the square matrix are represented as:

$$(T)_{mn} = \sum_{l=1}^{M \times N} w_l \exp[-j2\pi(m-n)t_l]. \quad (7)$$

For each range sampling point r, the reconstructed echoes are iteratively calculated, respectively; and first, second, and third iterative vectors $u_q, a_q, b_q$ are all column vectors of (M×N)×1, where q is a number of iteration steps. Initial values of the first, second, and third iterative vectors are set as $u_0 = 0$, $a_0 = b_0$, and an m$^{th}$ element of the third iterative vector $b_0$ is:

$$(b_0)_m = \sum_{l=1}^{M \times N} s_{comp}(x'_l, r) w_l \exp[-j2\pi m t_l]. \quad (8)$$

For the q$^{th}$ iteration, the respective vectors are updated to:

$$u_q = u_{q-1} + \frac{a_{q-1}^T a_{q-1}}{(Tb_{q-1})^T b_{q-1}} b_{q-1} \quad (9)$$

$$a_q = a_{q-1} - \frac{a_{q-1}^T a_{q-1}}{(Tb_{q-1})^T b_{q-1}} b_{q-1}$$

$$b_q = a_q + \frac{a_q^T a_q}{a_{q-1}^T a_{q-1}} b_{q-1}$$

in which, the superscript T represents the transpose of a vector or matrix, and the number of iterations is set as Q=100 In this case, $u_Q$ is an azimuth spectrum of the reconstructed echo, and the reconstructed echo $s_{uni}$ is denoted as:

$$s_{uni}(x'_1 + (m-1)v/(MF_p), r) = \text{IFFT}(u_Q)_m \quad (10)$$

in which, IFFT is fast inverse Fourier transform.

Embodiment

In this embodiment, the feasibility of the proposed method is verified by simulating Doppler echoes of a single-point target in an azimuth two-channel SAR system for two platforms, and simulation parameters are shown in Table 1.

TABLE 1

| Parameter names | Parameter values |
| --- | --- |
| Carrier frequency | 5.4 GHz |
| Reference slant-range distance | 1 km |
| Azimuth antenna length | 0.2 m |
| Pulse repetition frequency (PRF) | 110 Hz |
| Average spacing between two platforms | 5 m |

TABLE 1-continued

| Parameter names | Parameter values |
|---|---|
| Flight speed of the first platform | 20 m/s |
| Flight speed of the second platform | 19.8 m/s |

The echo simulation process is as follows: the operating carrier wavelength of the azimuth multi-channel SAR system is $\lambda=5.55$ cm, and the whole system includes one transmitting channel and M=2 receiving channels. Antenna phase centers of the transmitting channel and the first receiving channel coincides with each other, and are both located on the first platform. The second receiving channel is located on the second platform. Azimuth antenna lengths of the two platforms are both $L_a=0.2$ m, with a total of N=2030 pulses being transmitted. The pulse repetition frequency is $F_p=110$ Hz. The moving speeds of the first and second platforms are $v_1=20$ m/s and $v_2=19.8$ m/s, respectively; and a nominal moving speed of the system is $v=v_1$. The average distances between the two receiving channels and the transmitting channel are $\overline{\Delta x_1}=0$ m and $\overline{\Delta x_2}=5$ m, respectively. For an $(i=1, \ldots, N)^{th}$ pulse transmission moment, the azimuth location of the transmitting channel is $x_i=(i-N/2)\times(v_1/F_p)$, and an azimuth relative location of the $(k=1, \ldots, M)^{th}$ receiving channel to the transmitting channel at this time is $\Delta x_{ik}=(i-N/2)\times((v_k-v)/F_p)-\overline{\Delta x_k}$. A reference slant-range distance of an imaging point target is $r_0=1$ km, and the received Doppler echo after being corrected for channel errors and preprocessed for phase synchronization is denoted as:

$$s(x_i, \Delta x_{ik}, r_0) = rect\left(\frac{x_i L_a}{0.886\lambda r_0}\right)\exp\left[\frac{-j2\pi}{\lambda}\left(\sqrt{x_i^2+r_0^2}+\sqrt{(x_i+\Delta x_{ik})^2+r_0^2}\right)\right] \quad (11)$$

in which, rect is a rectangular window function.

Figure 2A:
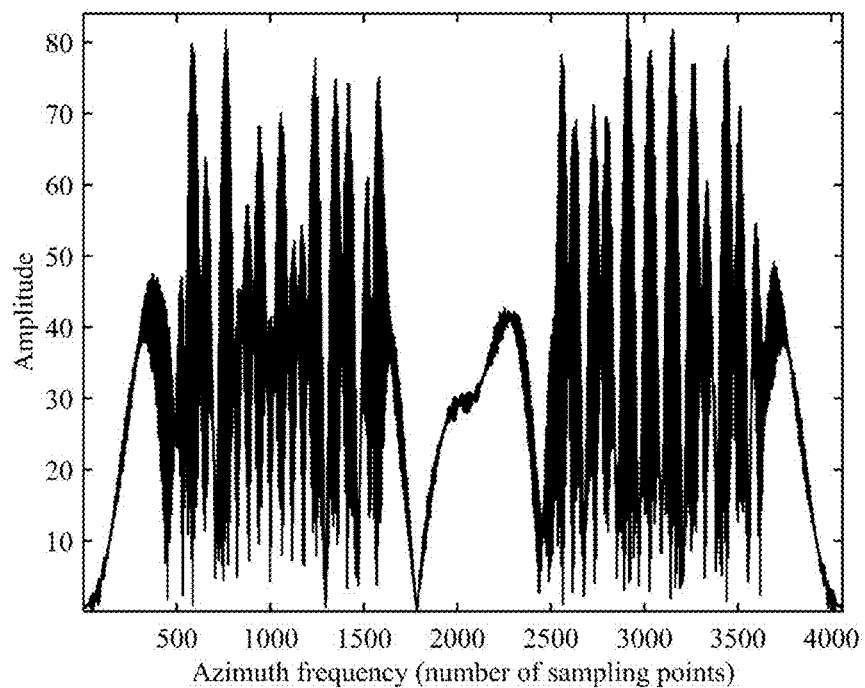
FIG. 2 (a) shows an azimuth spectrum of echoes reconstructed by the traditional reconstruction filter method.
Figure 2B:
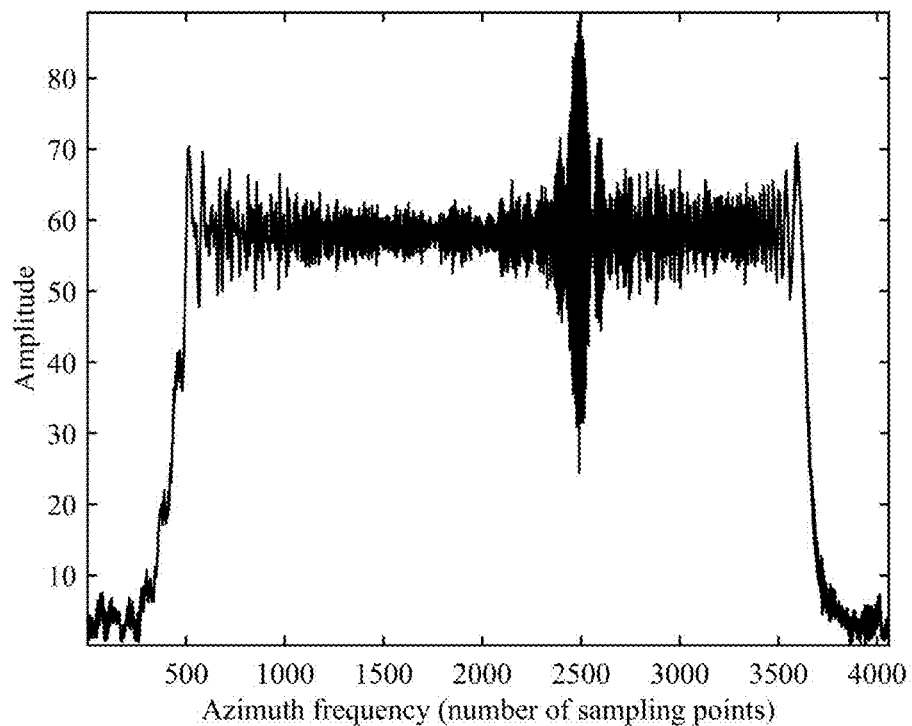

FIG. 2 (a) and FIG. 2 (b) show azimuth spectra of echoes reconstructed by the traditional reconstruction filter method and the method of the present disclosure, respectively. It can be seen that the azimuth spectrum of the echoes reconstructed by the method of the present disclosure is significantly better than the result of the traditional reconstruction filter method.

Figure 3A:
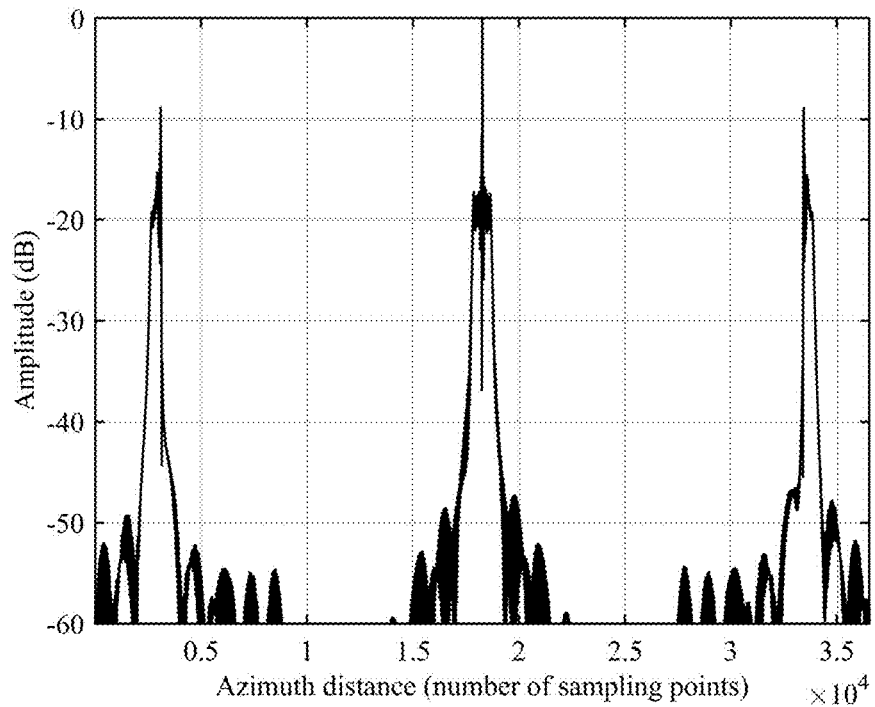
FIG. 3 (a) shows a result of azimuth compression of echoes reconstructed by the traditional reconstruction filter method.
Figure 3B:
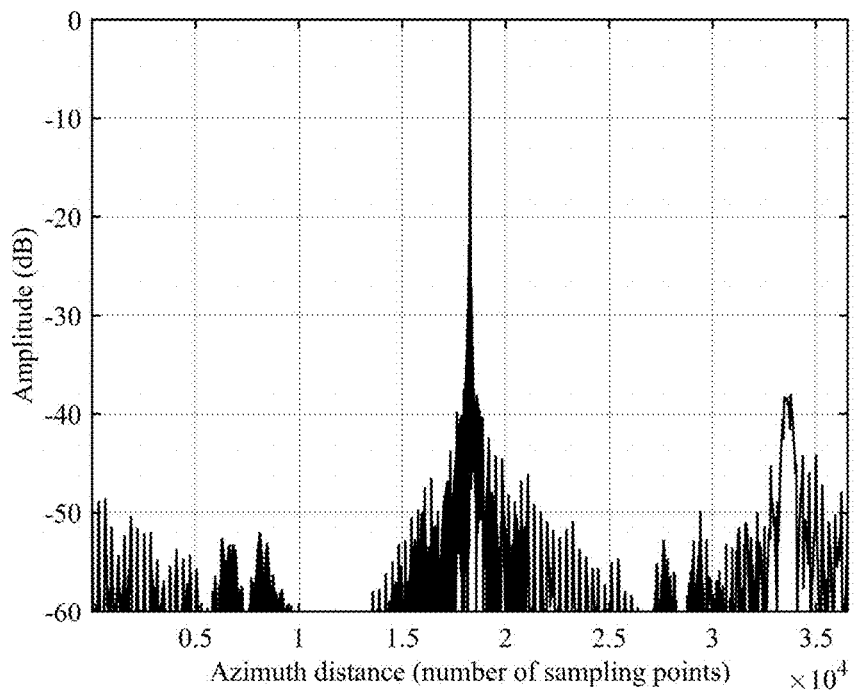

In order to verify the reconstruction effect, the reconstructed echo $s_{uni}$ is compressed in an azimuth direction, and the echo after azimuth compression is expressed as:

$$s_{focus} = IFFT\left(FFT(s_{uni})\times\exp\left[\frac{j4\pi r_0}{\lambda}\sqrt{1-\frac{\lambda^2 f_a^2}{4v^2}}\right]\right) \quad (12)$$

wherein, $-MF_p/2 \leq f_a < MF_p/2$ is an azimuth frequency, FFT is fast Fourier transform, and IFFT is fast inverse Fourier transform. FIG. 3 (a) and FIG. 3 (b) show results of azimuth compression of echoes reconstructed by the traditional reconstruction filter method and the method of the present disclosure, respectively. It can be seen that the method of the present disclosure results in a false target energy reduction up to 30 dB.

The objects, technical solutions and beneficial effects of the present disclosure are further described in detail in specific embodiments described above. It should be understood that the foregoing descriptions are merely specific embodiments of the present disclosure, and are not intended to limit the present disclosure. Within the spirit and principles of the present disclosure, any modifications, equivalent substitutions, improvements, etc., are within the protection scope of the present disclosure.

The invention claimed is:

1. An azimuth ambiguity suppression method for a spaceborne SAR in spatially non-uniform sampling, comprising:
   act 1: compensating for a phase difference between the channels according to locations of transmitting and receiving stations for channel echoes;
   act 2: calculating an azimuth sampling location of each channel of the channels at a moment of a pulse transmission;
   act 3: sorting azimuth sampling locations of all channels and their corresponding channel echoes after the phase difference between the channels is compensated in ascending order; and
   act 4: calculating reconstructed echoes by using an adaptive weight-conjugate gradient-Toeplitz matrix algorithm in combination with a sorting result of act 3.

2. The azimuth ambiguity suppression method for the spaceborne SAR in spatially non-uniform sampling according to claim 1, wherein the act 1 comprises:
   setting an operating carrier wavelength of an azimuth multi-channel SAR system to be $\lambda$, wherein the SAR system comprises one transmitting channel and M receiving channels, with N pulses being transmitted in total, and each time pulses are transmitted from the transmitting channel, the channel echoes are received separately by the M receiving channels, a pulse repetition frequency is denoted as $F_p$, and a nominal moving speed is v, for a transmission moment of the $(i=1, \ldots, N)^{th}$ pulse, an azimuth location of the transmitting channel is denoted as $x_i$, an azimuth relative location of the $(k=1, \ldots, M)^{th}$ receiving channel to the transmitting channel is denoted as $\Delta x_{ik}$, and a channel echo received by a receiving channel of the M receiving channels is denoted as $s(x_i, \Delta x_{ik}, r)$ after being corrected for channel errors and preprocessed for phase synchronization, wherein r is a range sampling point, and a reference slant-range distance of an imaging scene is $r_0$;
   wherein a multi-channel echo $s_{comp}$ after compensating the phase difference between the channels according to the locations of the transmitting and receiving stations is expressed as:

$$s_{comp}(x_i, \Delta x_{ik}, r) = s(x_i, \Delta x_{ik}, r)\times\exp\left[\frac{j\pi\Delta x_{ik}^2}{2\lambda r_0}\right],$$

where exp represents natural exponential operation, j=$\sqrt{-1}$, which represents an imaginary number, and $\pi$ denotes pi.

3. The azimuth ambiguity suppression method for the spaceborne SAR in spatially non-uniform sampling according to claim 1, wherein the act 2 comprises:
   determining an azimuth sampling location $x'_{ik}$ of the transmission moment of the $i^{th}$ pulse and the $k^{th}$ receiving channel as:

$$x'_{ik} = x_i + \frac{\Delta x_{ik}}{2}.$$

4. The azimuth ambiguity suppression method for the spaceborne SAR in spatially non-uniform sampling according to claim 1, wherein the act 3 comprises:

sorting all azimuth sampling locations corresponding to the transmission moments of N pulses and the M receiving channels in ascending order, a list of the sorted azimuth sampling locations $x'_l$ being expressed as:

$$x'_l \in \{x'_{ik}, i=1,\ldots,N, k=1,\ldots,M\}, l=1,\ldots,M \times N,$$
$$x'_{l-1} < x'_l < x'_{l+1},$$

where l represents a sorted azimuth sampling location index; and corresponding multi-channel echoes after the phase difference between the channels is compensated as:

$$s_{comp}(x'_l, r) = s_{comp}(x_i, \Delta x_{ik}, r) \leftarrow x'_l = x'_{ik}.$$

5. The azimuth ambiguity suppression method for the spaceborne SAR in spatially non-uniform sampling according to claim 1, wherein the act 4 comprises:

normalizing the set $x'_l$ of the sorted azimuth sampling locations, such that $0 \leq t_1 < \ldots < t_{M \times N} < 1$, denoted as:

$$t_l = (x'_l - x'_1)/(Nv/F_p),$$

where, $t_l$ represents a set $x'_l$ of the normalized sorted azimuth sampling location, letting $t_0 = t_{M \times N} - 1$, $t_{M \times N+1} = t_1 + 1$, and an adaptive weight is calculated as:

$$w_l = (t_{l+1} - t_{l-1})/2,$$

the Toeplitz matrix T is a square matrix of $(M \times N) \times (M \times N)$, and elements in an $n^{th}$ column and an $m^{th}$ row of the square matrix are expressed as $(T)_{mn}$:

$$(T)_{mn} = \sum_{l=1}^{M \times N} w_l \exp[-j2\pi(m-n)t_l],$$

for each range sampling point r, the reconstructed echoes are iteratively calculated respectively, and first, second, and third iterative vectors $u_q, a_q, b_q$ are all column vectors of $(M \times N) \times 1$, where q is a number of iteration acts; initial values of first, second, and third iterative vectors are set as $u_0 = 0$, $a_0 = b_0$, and an $m^{th}$ element of the third iterative vector $b_0$ is:

$$(b_0)_m = \sum_{l=1}^{M \times N} s_{comp}(x'_l, r) w_l \exp[-j2\pi m t_l],$$

for the $q^{th}$ iteration, the respective iterative vectors are updated to:

$$u_q = u_{q-1} + \frac{a_{q-1}^T a_{q-1}}{(Tb_{q-1})^T b_{q-1}} b_{q-1}$$

$$a_q = a_{q-1} - \frac{a_{q-1}^T a_{q-1}}{(Tb_{q-1})^T b_{q-1}} b_{q-1}$$

$$b_q = a_q + \frac{a_q^T a_q}{a_{q-1}^T a_{q-1}} b_{q-1},$$

the superscript T represents the transpose of a vector or matrix, and the number of iterations is set as Q; $u_Q$ is an azimuth spectrum of the reconstructed echo, and the reconstructed echo $s_{uni}$ is denoted as:

$$s_{uni}(x'_1 + (m-1)v/(MF_p), r) = \text{IFFT}(u_Q)_m,$$

where, IFFT is fast inverse Fourier transform.

* * * * *